United States Patent
Guidetti et al.

(10) Patent No.: US 9,625,715 B2
(45) Date of Patent: Apr. 18, 2017

(54) SYSTEM, DEVICE AND METHOD EMPLOYING MACHINE-READABLE SYMBOL READER AND SHIELD

(71) Applicant: Datalogic IP Tech Srl, Bologna (IT)

(72) Inventors: Maurizio Guidetti, Bologna (IT);
Fabio Pentassuglia, Bologna (IT);
Claudio Baldi, Bologna (IT)

(73) Assignee: DATALOGIC IP TECH SRL, Bologna (IT)

( * ) Notice: Subject to any disclaimer, the term of this patent is extended or adjusted under 35 U.S.C. 154(b) by 0 days.

(21) Appl. No.: 14/921,371

(22) Filed: Oct. 23, 2015

(65) Prior Publication Data
US 2016/0139406 A1    May 19, 2016

Related U.S. Application Data

(62) Division of application No. 14/543,664, filed on Nov. 17, 2014, now Pat. No. 9,230,146.

(51) Int. Cl.
| | | |
|---|---|---|
| *G06K 13/04* | (2006.01) | |
| *G02B 27/00* | (2006.01) | |
| *G02B 27/02* | (2006.01) | |
| *G02B 7/00* | (2006.01) | |
| *G06K 7/10* | (2006.01) | |

(52) U.S. Cl.
CPC ......... *G02B 27/0006* (2013.01); *G02B 7/008* (2013.01); *G02B 27/028* (2013.01); *G06K 7/10821* (2013.01); *G06K 7/10831* (2013.01)

(58) Field of Classification Search
CPC ........................ G06K 7/10821; G06K 7/10831
USPC .................. 235/454, 459, 462.14, 462.43
See application file for complete search history.

(56) References Cited

U.S. PATENT DOCUMENTS

| | | | |
|---|---|---|---|
| 3,122,237 A | 2/1964 | Stenstrom | |
| 5,191,196 A | 3/1993 | Mercede et al. | |
| 5,252,814 A | 10/1993 | Tooley | |
| 6,431,450 B1* | 8/2002 | Lundahl | G06K 7/10693 198/804 |
| 7,540,422 B2 | 6/2009 | Knowles et al. | |
| 8,627,946 B2* | 1/2014 | Baitz | G07G 1/0045 198/502.1 |

(Continued)

FOREIGN PATENT DOCUMENTS

CN          103144802 A      6/2013

*Primary Examiner* — Seung Lee
(74) *Attorney, Agent, or Firm* — Seed IP Law Group LLP

(57) ABSTRACT

Machine-readable symbol reader systems including one or more shields are provided. One example machine-readable symbol reader system includes a conveyor system to convey objects bearing one or more machine-readable symbols past a first region that is transmissive to light. The system includes a machine-readable symbol reader having a housing, a window formed in the housing, and at least one optical sensor received in the housing and having a field of view that extends outward of the window, at least the window of the machine-readable symbol reader positioned relatively below the conveyor system with the field of view aligned with the first region of the conveyor system. The system can further include a shield having a frame with a plurality of apertures that are transmissive to light, the shield positioned relatively below the first region and positioned relatively above the window of the machine-readable symbol reader.

20 Claims, 7 Drawing Sheets

(56) References Cited

U.S. PATENT DOCUMENTS

| | | |
|---|---|---|
| 8,997,972 B2 | 4/2015 | Ryabinin et al. |
| 2010/0140357 A1* | 6/2010 | Roslak .................. G06K 7/1096 235/462.43 |
| 2011/0181721 A1 | 7/2011 | Bloom et al. |
| 2012/0187195 A1 | 7/2012 | Actis et al. |

* cited by examiner

SYSTEM, DEVICE AND METHOD EMPLOYING MACHINE-READABLE SYMBOL READER AND SHIELD

BACKGROUND

Technical Field

The present disclosure generally relates to machine-readable symbol readers and systems employing such readers, and in particular relates to shields to protect a window of a machine-readable symbol reader.

Description of the Related Art

Machine-readable symbols encode information in a form that can be optically read via an appropriately configured machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed on patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at warehouses or in stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

Some implementations employ a conveyor system (e.g., driven conveyor belt) to move objects bearing machine-readable symbols past a field of view of a machine-readable symbol reader. Such implementations are commonly found at retail checkout or point of sales locations (e.g., grocery store or supermarket checkout counters) and in package sorting systems (e.g., postal or courier distribution centers).

BRIEF SUMMARY

Machine-readable symbol readers typically include a housing that encloses and protects various components of the reader, for instance optical components, a scan engine and/or optical sensor (e.g., CCD array, CMOS image sensor). A window in the housing allows the reception of light by various components of the reader. For example, light reflected or fluoresced from a machine-readable symbol can enter the reader housing through the window. An optical sensor detects the light and produces a representative signal. Circuitry, for instance a processor, processes the representative signal to read the symbol. Components enclosed within the housing can optionally illuminate the machine-readable symbol (e.g., flood illumination, laser or flying spot of light) via the window in the housing.

In some readers, the window includes a glass pane or other transparent or translucent barrier placed across the window opening. The glass pane or other barrier prevents the entry of objects or contaminants into the reader housing. However, contaminants (e.g., dust, dirt, or smudges) can collect on the glass pane and obscure or otherwise inhibit the transmission of light through the window, thereby reducing the accuracy of the reader and requiring periodic cleaning of the glass pane.

Furthermore, glass panes are typically fragile or otherwise susceptible to damage. For example, items (e.g., objects that have fallen from a conveyor system) contacting the glass pane with sufficient force will break or otherwise damage the glass pane. A broken glass pane may require repair or replacement of the pane or the entire reader. Other transparent or translucent barriers, for instance acrylic or polycarbonate barriers may be subject to damage such as marring when struck by falling items. This can adversely affect of the optical characteristics of the transparent or translucent barrier.

In some implementations, a machine-readable symbol reader may be located relatively below a conveyor system that conveys objects bearing machine-readable symbols from a first location to a second location. A machine-readable symbol reader reads each machine-readable symbol as the conveyor system conveys the corresponding object past a field of view of the reader. However, in such a configuration it is possible that one or more of the objects may fall off of the conveyor system during movement. Falling objects or other environmental items that contact the machine-readable symbol reader may damage the reader. Consequently, it is desirable to protect the window of the reader from damage.

It may be possible to place an additional glass or plastic cover in front of the window. However, these items are also susceptible to collection of contaminants, resulting in multiple layers of contaminants between the reader and the symbol and reducing the accuracy of the reader. Therefore, these items may require frequent replacement or cleaning, resulting in additional labor and parts cost. Furthermore, a glass cover is typically insufficient to effectively protect the window against large or heavy objects.

A machine-readable symbol reader system may be summarized as including: a conveyor system to convey objects bearing one or more machine-readable symbols between a first location and a second location past a first region that is transmissive to light; a machine-readable symbol reader having a housing, a window formed in the housing, and at least one optical sensor received in the housing and having a field of view that extends outward of the window, the window transmissive to at least some wavelengths of light, at least the window of the machine-readable symbol reader positioned relatively below the conveyor system with the field of view aligned with the first region of the conveyor system; and a shield having a frame with a plurality of apertures that are transmissive to light, the shield positioned relatively below the first region and positioned relatively above the window of the machine-readable symbol reader.

The shield may include a grate. The shield may include a metal grate. The frame of the shield may include at least one of a plurality of bars or a plurality of wires. Each of the plurality of bars may have a longitudinal axis that is perpendicular to a direction of conveyance in which the conveyor system conveys objects. Each of the plurality of apertures may extend across an entirety of the window in at least one direction to form a plurality of unobstructed optical planes between the first region of the conveyor system and the window. The plurality of apertures may collectively have a first surface area, any portions of the frame that obstruct light may collectively have a second surface area, and the first surface area may be greater than or equal to the second surface area. The shield may be physically coupled to the machine-readable symbol reader. The shield may be integral to the housing and may extend across the window. The window may have a first set of dimensions including at least a first length and a first width, the shield may have a second set of dimensions including at least a second length and a second width, the second length may be at least equal or greater than the first length and the second width may be at least equal or greater than the first width, and the shield may extend across the window.

The machine-readable symbol reader system may further include a blower physically coupled to the shield, the blower may be positioned to cause a circulation of fluid across the window. The conveyor system may include at least a first conveyor assembly and a second conveyor assembly, and the first region of the conveyor system may include a discontinuity between the first conveyor assembly and the second conveyor assembly. The shield may have an upper face, and the shield may be positioned with the upper face at an angle with respect to a direction of gravity. The shield may include one or more components that are selectively electrically energizable to generate heat to defog the window of the machine-readable symbol reader.

A shield to protect a component of a machine-readable symbol reader system, the component having an area and a first set of dimensions including at least a first length and a first width, the shield may be summarized as including: a frame having a plurality of apertures through which light passes, the frame having a second set of dimensions, the second set of dimensions including at least a second length and a second width, the second length at least equal or greater than the first length and the second width at least equal or greater than the first width, the shield positionable relatively above the component to provide a plurality of unobstructed optical planes through the shield to the component while encompassing the area of the component.

The component may be a window of a machine-readable symbol reader. The component may be a mirror. The component may be a housing of a machine-readable symbol reader. The frame of the shield may include at least one of a plurality of metal bars or a plurality of metal wires. The shield may further include one or more components that are selectively electrically energizable to generate heat.

A method of protecting a component of a machine-readable symbol reader system that includes a machine-readable symbol reader having a housing, optical sensor in the housing, and a window transmissive to at least some wavelengths of light, the method may be summarized as including: positioning the machine-readable symbol reader under a portion of a conveyor system to provide the optical sensor with a field of view through the window of objects carried on an upper surface of the conveyor system; and positioning a shield comprising a frame with a plurality of apertures above the component and below the upper surface of the conveyor system, the apertures which pass light through the frame.

Positioning a shield may include positioning the shield above a mirror and below the upper surface of the conveyor system. Positioning a shield may include positioning the shield above the window and below the upper surface of the conveyor system. Positioning a shield may include positioning the shield having a plurality of bars or wires to encompass the window. Positioning a shield may include positioning the shield having a plurality of parallel bars or wires to encompass the window. The shield may be integral to a blower, and positioning the shield above the window may include positioning the blower such that the shield is above the window and below the upper surface of the conveyor system. Positioning the shield above the window and below the upper surface of the conveyor system may include one of physically coupling the shield to the conveyor system or physically coupling the shield to the machine-readable symbol reader. The method may further include electrically energizing one or more parts of the shield to generate heat to defog the component.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol readers or other imager or imaging systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Figure 1:
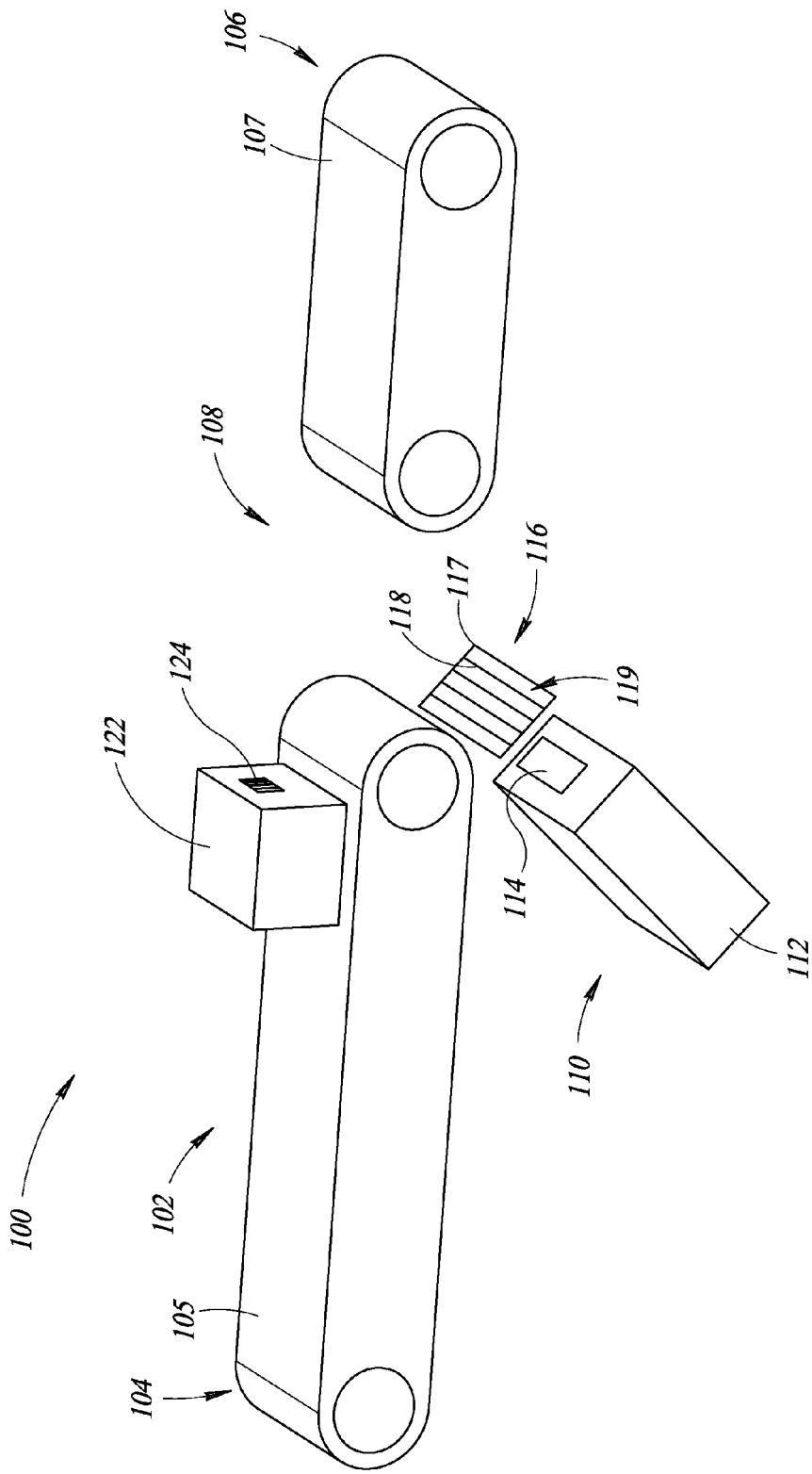
FIG. 1 is an isometric view of a machine-readable symbol reader system including a conveyor system, machine-readable symbol reader, and shield, according to at least one illustrated embodiment.

FIG. 1 shows a machine-readable symbol reader system 100, according to at least one illustrated embodiment. The system 100 includes a conveyor system 102, a machine-readable symbol reader 110, and a shield 116.

The conveyor system 102 conveys objects (e.g., object 122) bearing one or more machine-readable symbols (e.g., machine-readable symbol 124) between a first location 105 and a second location 107. The conveyor system 102 conveys objects past a first region 108 that is transmissive to light. As an example, as shown in FIG. 1, the conveyor system 102 includes a first conveyor assembly 104 and a second conveyor assembly 106. The first region 108 that is transmissive to light can, for example, take the form of a discontinuity between the first conveyor assembly 104 and the second conveyor assembly 106. Thus, for example, object 122 bearing machine-readable symbol 124 passes across the first region 108 as object 122 transits from the first location 105 to the second location 107 via the first conveyor assembly 104 and the second conveyor assembly 106.

The machine-readable symbol reader 110 can be any device capable of reading (e.g., detecting and/or decoding) machine-readable symbols (e.g., PDF417, Code 128, etc.). For example, the machine-readable symbol reader 110 can be an imaging-based symbol reader, a laser-based symbol reader, or other types of machine-readable symbol readers.

The machine-readable symbol reader 110 has a housing 112 that encloses one or more components of the machine-readable symbol reader 110. A window 114 in the housing 112 is transmissive to at least some wavelengths of light. Generally, the window 114 is designed and/or positioned relative to the housing 112 to enable various components received within the housing 112 to transmit or receive light. For example, light reflected or fluoresced from a machine-readable symbol enters the reader housing 112 via the window 114. The machine-readable symbol reader 110 may actively illuminate the machine-readable symbol, or may rely on illumination in the ambient environment to illuminate the machine-readable symbol.

An optical sensor received within the housing 112 detects the light and produces a representative signal. Circuitry, for instance a processor, processes the representative signal to read the symbol. Components enclosed within the housing 112 can illuminate the machine-readable symbol (e.g., through flood illumination or laser scanning) via the window 114, as well.

In some implementations, the window 114 includes a glass pane or other transparent or translucent barrier placed across the window opening. The glass pane or other barrier can prevent the entry of objects or contaminants, including fine contaminants such as dust or moisture into the reader housing 112.

The machine-readable symbol reader system 100 further includes a shield 116 positioned to protect at least the window 114 of the housing 112 from falling items or debris.

The shield 116 has a frame 117 with a plurality of elements 118 (only one called out) which form a plurality of apertures 119 (only one called out) that are transmissive to light. The shield 116 prevents items (e.g., objects falling from the conveyor system 102) larger than a defined size (i.e., dimensions of the apertures 119) from passing through the shield 116.

In some implementations, the shield 116 takes the form of a grate (e.g., a metal grate). The grate can be shaped as a grill or a grid. In some implementations, the shield 116 includes a plurality of bars 210 and/or a plurality of wires or cables 310, as will be discussed further with respect to FIGS. 2 and 3 respectively. The spacing between the elements 118 of the frame 117 of the shield 116 is set to assure that items likely to damage the machine-readable symbol reader will not pass through the shield 116. For example, an item's likelihood of causing damage may be related to density and size or volume and/or type of material (e.g., metal, cardboard, plastic), and the presence or absence of sharp edges or points. The spacing of the elements 118 may be set to form apertures 119 with dimensions sufficiently small to prevent the passage of items likely to cause damage, while not overly obscuring a field of view of the machine-readable symbol reader 110.

As shown in FIG. 1, the machine-readable symbol reader is positioned relatively below the conveyor system 102. The optical sensor received within the housing 112 captures an image of a field of view that extends outward of the window 114. In particular, as shown in FIG. 1, the field of view is aligned with the first region 108 of the conveyor system 102.

The shield 116 is positioned relatively above the window 114 and relatively below the conveyor system 102. The shield 116 can be positioned at various distances from the window 114.

The machine-readable symbol reader 110 reads one or more machine-readable symbols present on an object as the object passes over the first region 108. In particular, light reflected or fluoresced from a machine-readable symbol passes through the first region 108, the apertures 119 of the shield 116, and the window 114 to reach the optical sensor of the machine-readable symbol reader 110. Thus, the shield 116 protects the window 114 from environmental hazards (e.g., falling objects or other items) without interfering with the reading or illumination of symbols by the reader 110. In particular, in some implementations, the shield 116 is positioned so that illumination (e.g., laser beam, flood light) can pass through at least one aperture of the shield 116 and reach the first region 108.

In some implementations, conveyor assemblies 104 and 106 are conveyor belt assemblies, as shown in FIG. 1. In other implementations, the conveyor system 102 includes different conveyors in addition or alternatively to belt-based assemblies 104 and 106. For example, conveyor system 102 can include roller conveyor assemblies, slat conveyor assemblies, wire mesh conveyor assemblies, chutes, and/or other machines or structures for moving objects. In some implementations, the conveyor system 102 includes only a single conveyor assembly.

Furthermore, although FIG. 1 shows conveyor assemblies 104 and 106 at a same relative height, in some implementations, the assemblies 104 and 106 are at different heights, orientations, angles, or directions relative to each other. For example, in some implementations, conveyor assembly 106 is at a lower relative height than conveyor assembly 104, so that the objects more easily transition over the discontinuity between assemblies 104 and 106.

In addition, although FIG. 1 shows the first region 108 as a discontinuity between assemblies 104 and 106, such discontinuity is provided as an example only. The conveyor system 102 can include a first region 108 that is transmissive to light that has other, different structures. For example, the first region 108 that is transmissive to light can take the form of an aperture formed within a single conveyor assembly (e.g., an aperture formed between spaced rollers of a roller conveyor assembly), a portion of a conveyor assembly that is transmissive to light (e.g., a clear plastic or glass window embedded within a conveyor assembly), or many other structures. Furthermore, in some implementations, a guide that is transmissive to light is placed in the discontinuity between assemblies 104 and 106.

The housing 112 of the machine-readable symbol reader 110 can be formed from various materials or combinations of materials including metals, plastics, rubbers, or other materials. The housing 112 can be continuous or formed from multiple components that are physically coupled. In some implementations, a user interface (not shown) or other interactive features or components is located on the exterior of the housing 112 to allow convenient operation. In some implementations, the housing 112 provides access to various ports or interfaces for permitting electrical or communicative coupling of the machine-readable symbol reader 110 to other machines or power sources.

The optical sensor of the machine-readable symbol reader 110 can be a wide range of image sensing devices for converting an optical image (or another wavelength in the electromagnetic spectrum) into an electrical signal. For example, the optical sensor can be a digital sensor, such as a charge-coupled device (CCD) sensor or complimentary metal-oxide semiconductor (CMOS) sensor, both of which can form a one-dimensional or two-dimensional array of pixels, which together constitute an electronic representation of the image. Each pixel location stores data indicative of the light intensity at that location of the image. The light intensity data for each pixel represents a color (e.g., red-green-blue) or monochrome intensity (e.g., grayscale).

In some implementations, in response to receiving an instruction from a controller (not shown), the optical sensor captures or acquires one or more images of the field of view. After the optical sensor has been exposed to light emanating from the field of view, data from all the pixels is sequentially read out in a selectable pattern (which may be row-by-row, sub-region by sub-region, or some other pattern). Optionally, an analog-to-digital converter converts the pixel intensity data to digital form. Other functions or outputs can be performed in addition or alternatively to such pixel intensity data.

In some implementations, the machine-readable symbol reader 110 further includes an optional illumination source (not shown) to actively illuminate the field of view. The illumination source can be any suitable source of light, such as one or more light emitting diodes (LEDs), flash strobes, incandescent or fluorescent lamps, or halogen bulbs. The illumination source generates light having one or more wavelengths. Alternatively, the machine-readable symbol reader 110 relies on light from the ambient environment.

One or more illumination drivers or controllers can optionally be provided. The illumination driver applies signals to the illumination source to, for example, strobe the illumination source at desired times or to light the illumination source constantly for a period of time. The illumination source is omitted in certain embodiments. The illumination source can be mounted within the housing 112 of the machine-readable symbol reader 110 (e.g., behind window 114) or may be mounted external to the housing, such as on an exterior surface of the housing 112 or remotely located from the machine-readable symbol reader 110. For example, the illumination source can be mounted to a separate stand and positioned some distance from the machine-readable symbol reader 110.

The optical sensor and the illumination driver connect to the controller, which may be, for example, one or more of a processor, microprocessor, controller, microcontroller, digital signal processor (DSP), graphical processing unit (GPU) or the like (generally "processor"). The connection may be via a bus or other communication mechanism, such as direct connections of a serial, parallel, or other type. The controller generally controls and coordinates the operation of other devices to which it is connected, such as one or more of the optical sensor, the illumination driver, and an audio/visual (A/V) driver.

The A/V driver drives one or more audio devices, such as a buzzer, speaker, or other audible indicator, to produce an audible "beep" or other indication when a machine-readable symbol is successfully read. In addition, or alternatively, the A/V driver drives an LED or other visual indicator device when a machine-readable symbol has been successfully read. Other devices or subsystems, such as a cash register or electronic scale, can also be connected to the controller. Moreover, the controller and/or the bus can interface with other controllers or computers, such as a cash register system or checkout terminal.

In some implementations, the machine-readable symbol reader 110 includes a memory, which may be implemented using one or more standard memory devices. The memory devices can include, for instance, RAM, ROM, and EEPROM devices, and can also include magnetic or optical storage devices, such as hard disk drives, flash memory, CD-ROM drives, and DVD-ROM drives. The machine-readable symbol reader 110 may also include an interface coupled to an internal data storage, such as a hard disk drive, flash memory, an optical disk drive, or another memory or drive. The interface may be configured for external drive implementations, such as over a USB, IEEE 1194, Ethernet, and/or RS232 connection.

According to one implementation, any number of program modules are stored in the drives and the memory, including an operating system (OS), one or more application programs or modules, such as instructions to be implemented, and data. Any suitable operating system may be employed. The data can include one or more configuration settings or parameters, or can include image data from the optical sensor and decoded machine-readable symbol data.

The machine-readable symbol reader 110 can also include or interface with one or more power supplies, which provide electrical power to the various components of the machine-readable symbol reader 110 via power connections.

Machine-readable symbol readers according to other implementations may have less than all of these components, may contain other components, or both. For example, in some implementations, the machine-readable symbol reader 110 is a fixed scanner, such as an on-counter scanner or in-counter scanner, or a portable scanner, such as a handheld scanner. In addition, the machine-readable symbol reader 110 can include a radiofrequency identification (RFID) reader or interrogator and/or or a magnetic stripe reader. Such may be particularly useful when employed as a point-of-sale (POS) terminal.

In some implementations, the machine-readable symbol reader 110 transmits the decoded machine-readable symbol data to a host or another device (e.g., a computer, a point-of-sale terminal, a point-of-sale computer system, or a cash register). The reader 110 can transmit the data in a point-to-point manner or via broadcast over a wired or wireless network. The host (or another device) can present data, prompts, and otherwise communicate with a user via one or more display devices. For example, the host (or another device) may present the decoded data to the user via a display, such as the object type (e.g., product type) corresponding to the scanned machine-readable symbol and data associated with the object type (e.g., a price of the product). The data associated with the object type can be encoded in the machine-readable symbol or accessed from a local or remote database based upon the object type. By way of another example, the host (or another device) can cause the decoded data to be recorded on a processor-readable medium. As another example, the host (or another device) can instruct a printer to print the object type and data corresponding to the object type (e.g., print the product type and associated price on a receipt). The machine-readable symbol reader 110 can also store the decoded machine-readable symbol data in the local memory. For example, if the machine-readable symbol reader 110 is operating in a portable mode or the host is unavailable, the decoded data can be buffered by the machine-readable symbol reader 110 for later transmission in a batch mode. Additionally, the machine-readable symbol reader 110 may acknowledge that machine-readable symbol data has been successfully decoded, such as by sounding a beep customarily associated with machine-readable symbol readers.

In some implementations, as shown in FIG. 1, the shield 116 is freestanding, or otherwise not physically coupled to either the machine-readable symbol reader 110 or the conveyor system 102. For example, the shield 116 is held in place or supported by a stand or pedestal. In other implementations, the shield 116 is coupled to the conveyor system 102 or other components of the system 100.

In some implementations, the shield 116 heats the window 114 or other adjacent structures that are transmissive or reflective of light (e.g., one or more mirrors) to prevent fogging. For example, an electrical voltage can be placed across one or more metallic or resistive components of the shield (e.g., resistive heating elements) to provide heating.

The window 114 has a first set of dimensions including at least a first length and a first width. The shield 116 has a second set of dimensions including at least a second length and a second width. In some implementations, the second length is at least equal or greater than the first length and the second width is at least equal or greater than the first width. For example, as shown in FIG. 1, the shield 116 has a width and length that are greater than the width and length of the window 114. Therefore, the shield 116 encompasses the entirety of the window 114. The shield 116 can have any suitable depth or thickness.

In some implementations, each of the plurality of apertures within the shield 116 (e.g., aperture 119) extends across an entirety of the window 114 in at least one direction to form a plurality of unobstructed optical planes between the first region 108 of the conveyor system 102 and the window 114. As an example, as shown in FIG. 1, each aperture of the shield 116 extends across an entire width of the window 114 to form a plurality of unobstructed optical planes in the horizontal direction relative to the reader 112. Thus, for example, the aperture 119 has a width that is greater than or equal to the width of the window 114. However, in other implementations, the unobstructed optical planes are formed in directions other than horizontal relative to the reader 112 (e.g., vertical or diagonal relative to the reader).

The shield 116 has an upper face that intercepts objects falling from the conveyor system 102. In some implementations, the shield 116 is positioned with the upper face at an angle with respect to the direction of gravity. Therefore, the upper face of the shield 116 redirects objects that fall from the conveyor system 102 away from the shield 116 and machine-readable symbol reader 110, rather than allowing the objects to come to rest upon the upper face.

Although a single machine-readable symbol reader 110 is depicted in FIG. 1, some implementations of the present disclosure include a plurality of machine-readable symbol readers within the same system or configuration. The plurality of machine-readable symbol readers can be located adjacent to each other (e.g., in an array or other grouping) or can be placed at different positions to, for example, have different fields of view. In such implementations, a single shield 116 can be positioned to protect some or all of the plurality of machine-readable symbol readers or a plurality of shields can be respectively provided and positioned to protect respective ones of such plurality of machine-readable symbol readers.

In addition, although the machine-readable symbol reader 110 is located below the conveyor system 102 in FIG. 1, the present teachings can be applied to other configurations as well, including systems in which the machine-readable symbol reader 110 is not positioned below a conveyor system. For example, the shields and other aspects of the present disclosure can be applied to systems in which the machine-readable symbol is located above or level with a conveyor system, mounted to a movable structure or vehicle (e.g., a forklift), or used in environments where the machine-readable symbol reader may be exposed to debris travelling at a significant speed (e.g., outdoor environments). Furthermore, aspects of the present disclosure can, in addition to machine-readable symbol readers, be applied to provide shields for other devices that include a window or other aperture transmissive to light such as, for example, certain cameras, laser scanning devices, or other optical devices.

Figure 2:
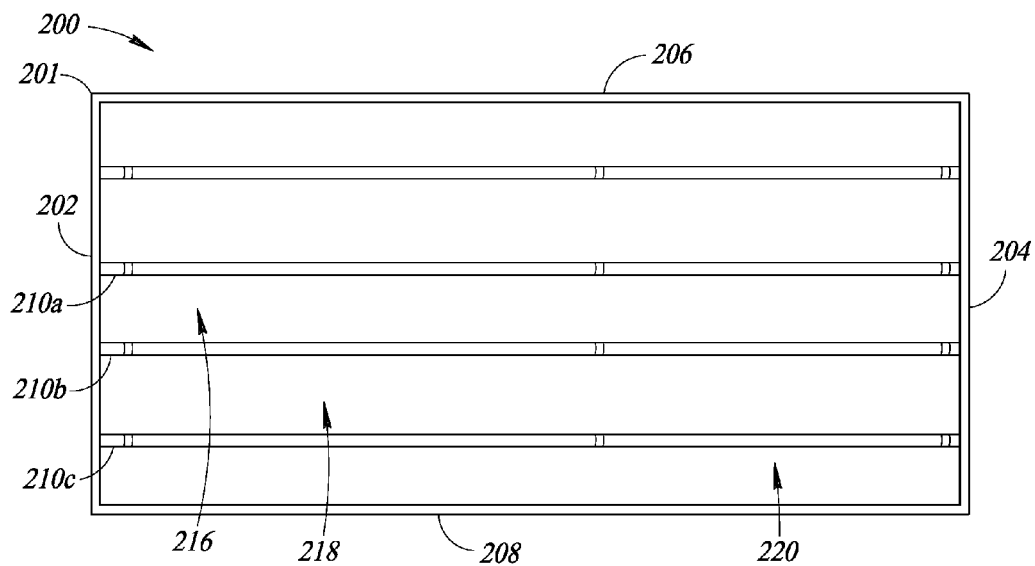
FIG. 2 is a front view of a shield including a frame with a plurality of bars, according to at least one illustrated embodiment.

FIG. 2 shows a shield 200 including a frame 201 with a plurality of bars, according to at least one illustrated embodiment. As shown in FIG. 2, the frame 201 includes a first side support 202, a second side support 204, an upper support 206, and a lower support 208. The supports 202-208 are pieces of metal, plastic, or other materials. In other implementations, the frame 201 does not include the upper and lower supports 206 and 208.

The first side support 202 is physically coupled to the upper support 206 and the lower support 208. Likewise, the second side support 204 is physically coupled to the upper support 206 and the lower support 208. In some implementations, one or more of welding, fasteners (e.g., screws, bolts, pins, etc.), adhesive, or other coupling means provide the physical connections between respective supports 202-208. In other implementations, the supports 202-208 are a single continuous structure formed using, for example, molding techniques or expanded metal techniques.

The shield 200 includes a plurality of bars 210, such as, for example, bars 210a, 210b, and 210c. The bars 210 can be metal bars or consist of other materials (e.g., plastics). The bars 210 can be cylindrical, as shown in FIG. 2, or can have other cross-sectional shapes including rectangular, oval-shaped, wing-shaped, slat-shaped, or other non-geometric cross-sectional shapes. The bars 210 can be identical to each other or non-identical. In some implementations, as shown in FIG. 2, the bars 210 are parallel to each other. However, in other implementations, the bars 210 are not parallel to each other. The bars 210 of the shield 200 can be of any thickness. The bars 210 can be solid or can be hollow such as pipes or tubes to provide shields of lighter weights.

Although not depicted in FIG. 2, in some implementations, the shield 200 includes one or more beams that provide additional support for the plurality of bars 210 at various locations. As an example, in some implementations, one or more beams extend from upper support 206 to lower support 208 (e.g., across a rear side of the bars 210 at a position equidistant from first side support 202 and second side support 204) and provide additional support to the bars 210. The beams can be physically coupled to the bars 210 or not physically coupled to the bars 210.

The plurality of bars 210 respectively form a plurality of apertures. The apertures are transmissive to light. For example, bar 210a and bar 210b form an aperture 216 therebetween. Likewise, bar 210b and 210c form an aperture 218 therebetween. As yet another example, bar 210c and lower support 208 form an aperture 220 therebetween. The spacing between the bars 210 is set to assure that items likely to damage the machine-readable symbol reader will not pass through the shield 200.

The plurality of apertures collectively have a first surface area. Any portions of the frame 201 that obstruct light collectively have a second surface area. In some implementations, the first surface area is greater than the second surface area. Therefore, the shield 200 provides protection against damaging items while a majority of its surface area is transmissive to light. In other implementations, the first surface area is less than the second surface area to provide increased protection.

In some implementations of the present disclosure, the shield 200 is positioned so that a longitudinal axis of each of the plurality of bars 210 is perpendicular to a direction of conveyance in which a conveyor system conveys objects bearing machine-readable symbols. As an example, referring again to FIG. 1, the shield 116 includes a plurality of elements 118, similar to shield 200 of FIG. 2. Conveyor system 102 conveys objects from location 105 to location 107 and past first region 108. As shown in FIG. 1, the shield 116 is positioned so that the longitudinal axis of each of the plurality of elements 118 is perpendicular to such direction of conveyance.

Figure 3:
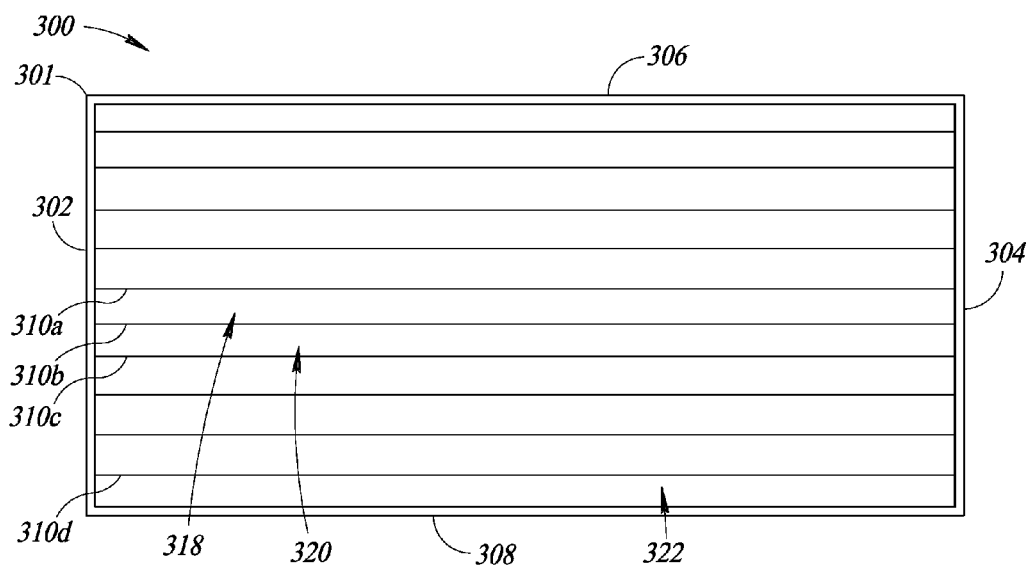
FIG. 3 is a front view of a shield including a frame with a plurality of wires, according to at least one illustrated embodiment.

FIG. 3 shows a shield 300 including a frame 301 with a plurality of wires, according to at least one illustrated embodiment. The frame 301 includes a first side support 302, a second side support 304, an upper support 306, and a lower support 308. The supports 302-308 can be pieces of metal, plastic, or other materials. In other implementations, the frame 301 does not include the upper and lower supports 306 and 308.

The first side support 302 is physically coupled to the upper support 306 and the lower support 308. Likewise, the second side support 304 is physically coupled to the upper support 306 and the lower support 308. One or more of welding, fasteners (e.g., screws, bolts, pins, etc.), adhesive, or other coupling means provide the physical connections between respective supports 302-308. In other implementations, the supports 302-308 are a single continuous structure formed using, for example, molding techniques.

The shield 300 includes a plurality of wires or cables (i.e., plurality of twisted wires) 310, such as, for example, wires 310a, 310b, 310c, and 310d. The wires can take the form of cables, metal wires, or can include other materials (e.g., metal wires with a plastic coating). The wires or cables 310 can be identical to each other or non-identical. In some implementations, as shown in FIG. 3, the wires 310 are parallel to each other. However, in other implementations, the wires 310 are not parallel to each other.

Although not depicted in FIG. 3, in some implementations, the shield 300 includes one or more beams that provide additional support for the plurality of wires 310 at various locations. As an example, in some implementations, one or more beams extend from upper support 306 to lower support 308 (e.g., across a rear side of the wires 310 at a position equidistant from first side support 302 and second side support 304) and provide additional support to the wires 310. The beams can be physically coupled to the wires 310 or not physically coupled to the wires 310.

The plurality of wires 310 respectively form a plurality of apertures that are transmissive to light. For example, wire 310 and wire 310b form an aperture 318 therebetween. Likewise, wire 310b and wire 310c form an aperture 320 therebetween. As yet another example, wire 310d and lower support 308 form an aperture 322 therebetween. The spacing between the wires 310 is set to assure that items likely to damage the machine-readable symbol reader will not pass through the shield 300.

In some implementations, the shield 300 is positioned so that a longitudinal axis of each of the plurality of wires 310 is perpendicular to a direction of conveyance in which a conveyor system conveys objects bearing machine-readable symbols. The frame 301 can maintain the wires 310 at various levels of tension.

Figure 4:
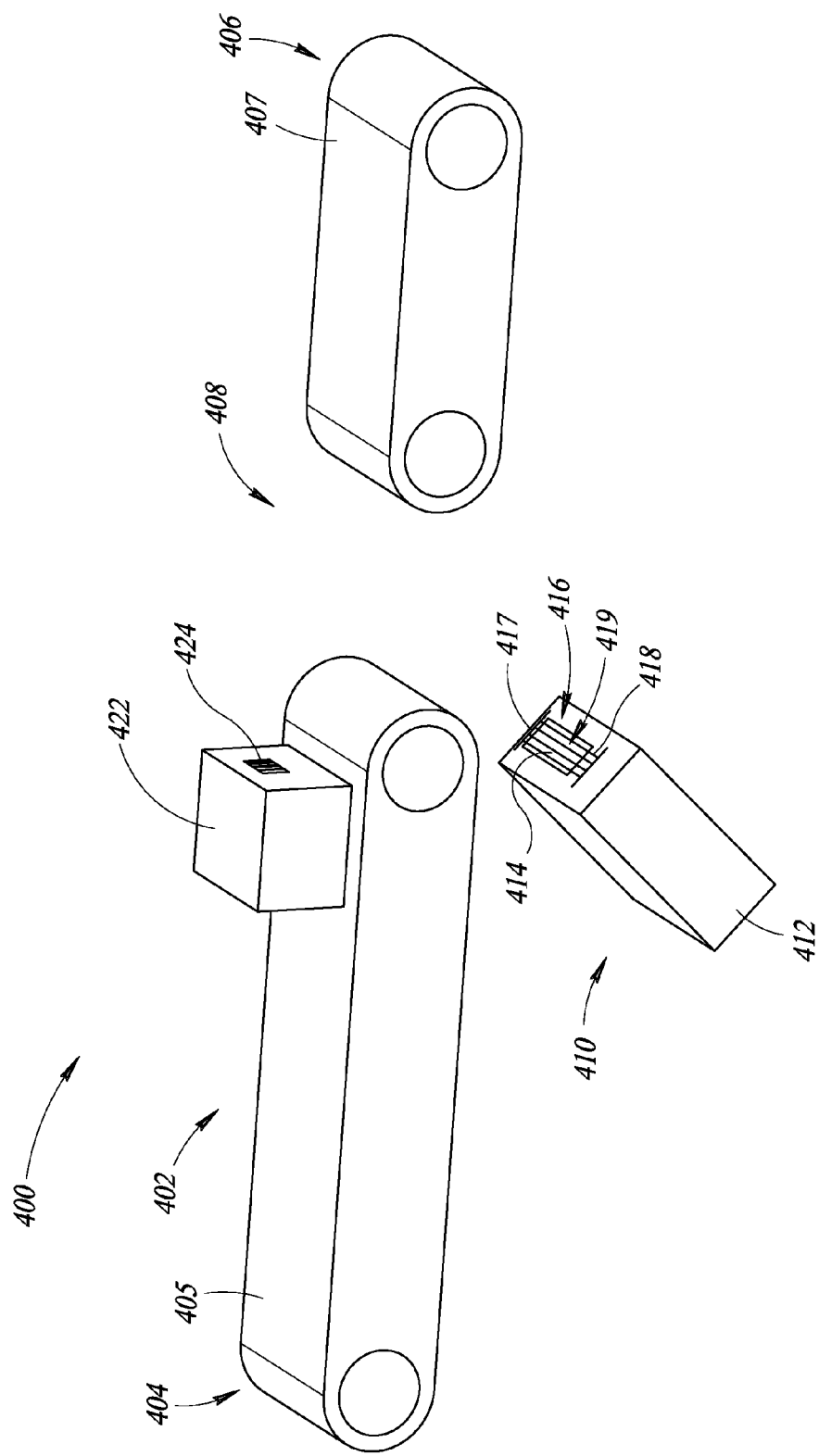
FIG. 4 is an isometric view of a machine-readable symbol reader system with a shield carried or mounted to a portion of the machine-readable symbol reader, according to at least one illustrated embodiment.

FIG. 4 shows a machine-readable symbol reader system 400, according to at least one illustrated embodiment. The system 400 includes a conveyor system 402 and a machine-readable symbol reader 410. A shield 416 is physically coupled to the machine-readable symbol reader 410.

The conveyor system 402 conveys objects (e.g. object 422) bearing one or more machine-readable symbols (e.g., machine-readable symbol 424) between a first location 405 and a second location 407. The conveyor system 402 conveys objects past a first region 408 that is transmissive to light. The conveyor system 402 can be the same as or similar to the conveyor system 102 of FIG. 1.

As shown in FIG. 4, the conveyor system 402 includes a first conveyor assembly 404 and a second conveyor assembly 406. The first region 408 that is transmissive to light can, for example, take the form of a discontinuity between the first conveyor assembly 404 and the second conveyor assembly 406. Thus, for example, object 422 bearing a machine-readable symbol 424 passes across the first region 408 as the object 422 transits from the first location 405 to the second location 407 via the first conveyor assembly 404 and the second conveyor assembly 406.

The machine-readable symbol reader 410 can be any device capable of reading (e.g., detecting and/or decoding) machine-readable symbols (e.g., PDF417, Code 128, etc.). For example, the machine-readable symbol reader 410 can be an imaging-based symbol reader, a laser-based symbol reader, or other types of machine-readable symbol readers. The machine-readable symbol reader 410 can be the same as or similar to the machine-readable symbol reader 110 of FIG. 1.

The machine-readable symbol reader 410 has a housing 412. The housing 412 encloses one or more components of the machine-readable symbol reader 410. A window 414 in the housing 412 is transmissive to at least some wavelengths of light. Generally, the window 414 is designed and/or positioned relative to the housing 412 to enable various components received within the housing 412 to transmit or receive light. For example, light reflected or fluoresced from a machine-readable symbol enters the reader housing 412 via the window 414. The machine-readable symbol reader 410 may actively illuminate the machine-readable symbol, or may rely on illumination in the ambient environment to illuminate the machine-readable symbol.

An optical sensor received within the housing 412 detects the light and produces a representative signal. Circuitry, for instance a processor processes the representative signal to read the symbol. Components enclosed within the housing 412 can illuminate the machine-readable symbol (e.g., through flood illumination or laser scanning) via the window 414, as well.

In some implementations, the window 414 includes a glass pane or other light transmissive barrier placed across the window opening. The glass pane or other barrier can prevent the entry of objects or contaminants (e.g., dust, moisture) into the reader housing 412.

The machine-readable symbol reader system 400 further includes a shield 416 physically coupled to the machine-readable symbol reader 410. The shield 416 prevents items larger than a defined size (e.g., objects falling from the conveyor system 402) from passing through the shield 416.

The shield 416 has a frame 417 with a plurality of elements 418 (only one called out) which form a plurality of apertures 419 (only one called out) that are transmissive to light. For example, as shown in FIG. 4, the shield 416 has an aperture 419.

In some implementations, the shield 416 includes a grate (e.g., a metal grate). The grate can be shaped as a grill or a grid. In some implementations, the shield 416 includes a plurality of bars 210. For example, the shield 416 can be the same as or similar to shield 200 of FIG. 2. In some implementations, the shield 416 includes a plurality of wires 310. For example, the shield 416 can be the same as or similar to shield 300 of FIG. 3. The spacing between the elements 418 of the frame 417 of the shield 416 is set to assure that items likely to damage the machine-readable symbol reader will not pass through the shield 416. For example, an item's likelihood of causing damage may be related to density and size or volume and/or type of material (e.g., metal, cardboard, plastic), and the presence or absence of sharp edges or points. The spacing of the elements 418 may be set to form apertures 419 with dimensions sufficiently small to prevent the passage of items likely to cause damage, while not overly obscuring a field of view of the machine-readable symbol reader 410.

As shown in FIG. 4, the machine-readable symbol reader 410 is positioned relatively below the conveyor system 402.

The optical sensor received within the housing 412 captures an image of a field of view that extends outward of the window 414. In particular, as shown in FIG. 4, the field of view is aligned with the first region 408 of the conveyor system 402.

The shield 416 is physically coupled to the machine-readable symbol reader 410. In some implementations, the shield 416 is integral to the housing 412 of the reader 410. For example, the shield 416 can be embedded within the housing 412. In other implementations, one or more of welding, fasteners (e.g., screws, bolts, pins, etc.), adhesive, or other coupling means mount the shield 416 to the housing 412. For example, the shield 416 can be an after-market addition to the reader 410. The shield 416 can be positioned at various distances from the window 414.

The machine-readable symbol reader 410 reads one or more machine-readable symbols present on an object as the object passes over the first region 408. In particular, light reflected or fluoresced from a machine-readable symbol passes through the first region 408, the apertures of the shield 416, and the window 414 to reach the optical sensor of the machine-readable symbol reader 410. Thus, the shield 416 protects the window 414 from environmental hazards (e.g., falling objects) without interfering with the reading or illumination of symbols by the reader 410. In particular, in some implementations, the shield 416 is positioned so that illumination (e.g., laser beam, flood light) can pass through at least one aperture of the shield 416 and reach the first region 408.

In some implementations, conveyor assemblies 404 and 406 are conveyor belt assemblies, as shown in FIG. 4. In other implementations, the conveyor system 402 includes different conveyor types in addition or alternatively to belt-based assemblies 404 and 406. For example, conveyor system 402 can include roller conveyor assemblies, slat conveyor assemblies, wire mesh conveyor assemblies, chutes, and/or other machines or structures for moving objects. In some implementations, the conveyor system 402 includes only a single conveyor assembly.

Furthermore, although FIG. 4 shows conveyor assemblies 404 and 406 at a same relative height, in some implementations, the assemblies 404 and 406 are at different heights, orientations, angles, or directions relative to each other. For example, in some implementations, conveyor assembly 406 is at a lower relative height than conveyor assembly 404, so that the objects more easily transition over the discontinuity between assemblies.

In addition, although FIG. 4 shows the first region 408 as a discontinuity between assemblies 404 and 406, such discontinuity is provided as an example only. The conveyor system 402 can include a first region 408 that is transmissive to light that has other, different structures. For example, the first region 408 that is transmissive to light can take the form of an aperture formed within a single conveyor assembly (e.g., an aperture formed between spaced rollers of a roller conveyor assembly), a portion of a conveyor assembly that is transmissive to light (e.g., a clear plastic or glass window embedded within a conveyor assembly), or many other structures. Furthermore, in some implementations, a guide that is transmissive to light is placed in the discontinuity between assemblies 404 and 406.

The housing 412 of the machine-readable symbol reader 410 can be formed from various materials or combinations of materials including metals, plastics, rubbers, or other materials. The housing 412 can be continuous or formed from multiple components that are physically coupled. In some implementations, a user interface (not shown) or other interactive features or components is located on the exterior of the housing 412 to allow convenient operation. In some implementations, various ports or interfaces for permitting electrical or communicative coupling of the machine-readable symbol reader 410 to other machines or power sources are formed within the housing 412.

The window 414 has a first set of dimensions including at least a first length and a first width. The shield 416 has a second set of dimensions including at least a second length and a second width. In some implementations of the present disclosure, the second length is at least equal or greater than the first length and the second width is at least equal or greater than the first width. For example, as shown in FIG. 4, the shield 416 has a width that is greater than the width of the window 414. Therefore, the shield 416 encompasses the entire width of the window 414.

In some implementations, each of the plurality of apertures 419 within the shield 416 extends across an entirety of the window 414 in at least one direction to form a plurality of unobstructed optical planes between the first region 408 of the conveyor system 402 and the window 414. As an example, as shown in FIG. 4, each aperture 419 of the shield 416 extends across an entire width of the window 414 to form a plurality of unobstructed optical planes in the horizontal direction relative to the reader 412. However, in other implementations, the unobstructed optical planes are formed in directions other than horizontal relative to the reader 412 (e.g., vertical or diagonal relative to the reader).

The shield 416 has an upper face that intercepts objects falling from the conveyor system 402. In some implementations, the shield 416 is positioned with the upper face at an angle with respect to the direction of gravity. Therefore, the upper face of the shield 416 redirects objects that fall from the conveyor system 402 away from the shield 416 and machine-readable symbol reader 410, rather than allowing the objects to come to rest upon the upper face.

Figure 5:
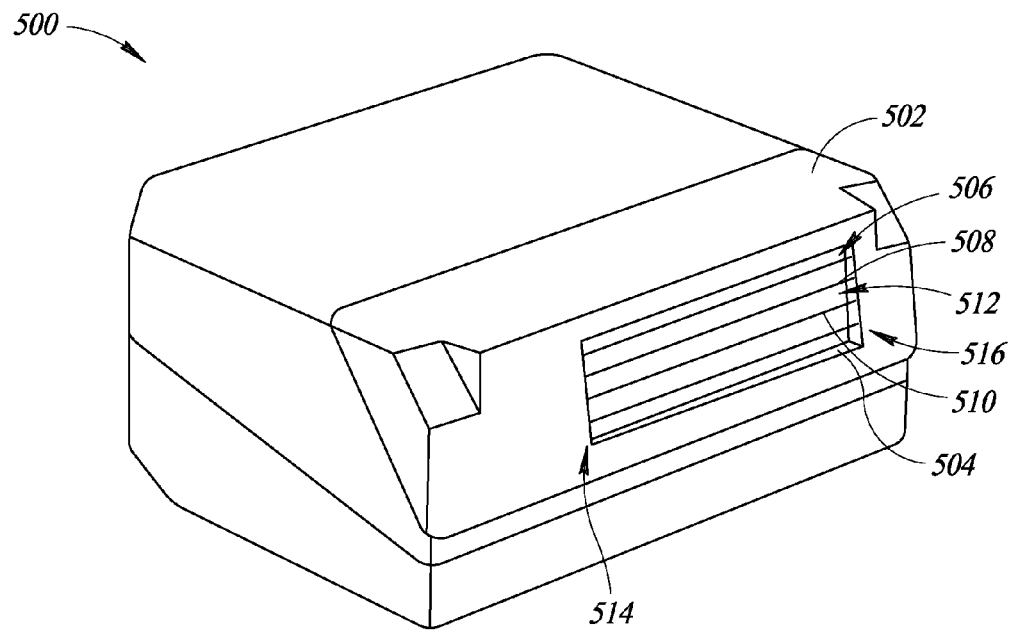
FIG. 5 is an isometric view of a machine-readable symbol reader with a shield integral thereto, according to at least one illustrated embodiment.

FIG. 5 shows a machine-readable symbol reader 500 with a shield 506 integral thereto, according to at least one illustrated embodiment. The machine-readable symbol reader 500 can be any device capable of reading (e.g., detecting and/or decoding) machine-readable symbols. For example, machine-readable symbol reader 500 can be the same as or similar to the machine-readable symbol reader 110 of FIG. 1.

Machine-readable symbol reader 500 has a housing 502 that encloses one or more components of the reader 500. A window 504 in the housing 502 is transmissive to at least some wavelengths of light.

The shield 506 is physically coupled to the machine-readable symbol reader 500. In particular, as shown in FIG. 5, the shield 506 can be integral to the reader housing 502 and can extend across the window 504.

As shown in FIG. 5, the shield 506 includes a plurality of bars, including, for example, bars 508 and 510. The bars can be metal bars or can be formed of other materials. The bars of shield 506 can be the same as or similar to the bars 210 of shield 200 of FIG. 2. In some implementations, shield 506 includes a plurality of wires in addition to or alternatively to the plurality of bars. For example, the wires can be the same as or similar to the wires 310 of shield 300 of FIG. 3.

The shield 506 includes a plurality of apertures that are transmissive to light. For example, bars 508 and 510 form an aperture 512 therebetween.

As shown in FIG. 5, the plurality of bars of the shield 506 are embedded within the housing 502. More particularly, each bar has a least a first end portion that is embedded within a first portion 514 of the housing 502 adjacent to a first side of the window 504 and a second end portion that is embedded within a second portion 516 of the housing 502 adjacent to a second side of the window 504. The second side of the window 504 is opposite the first side of the window 504. A center portion of each bar that is not embedded within the housing 502 extends across the window 504.

Figure 6:
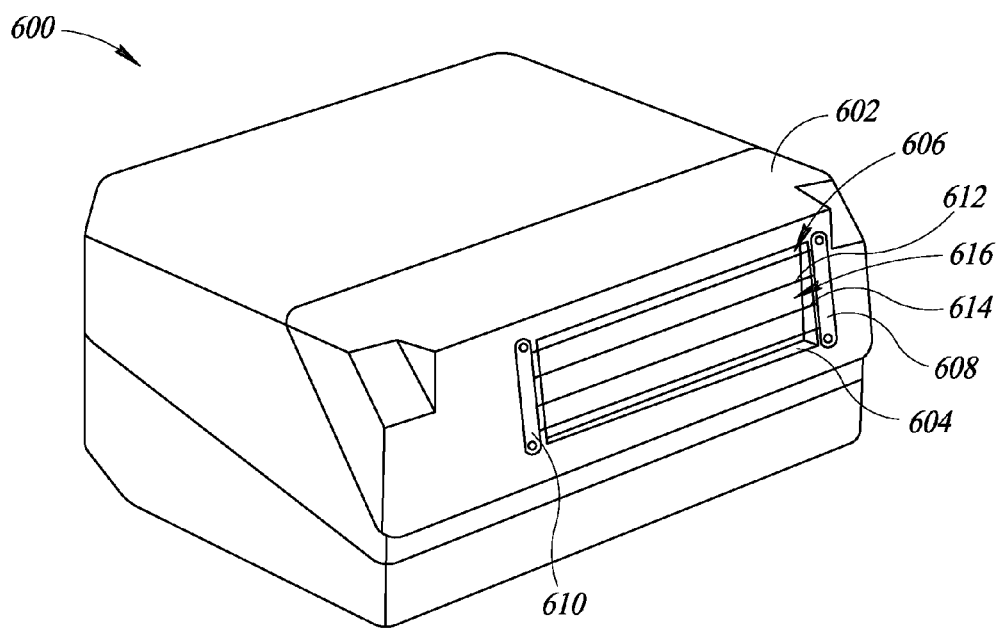
FIG. 6 is an isometric view of a machine-readable symbol reader with a shield mounted thereon, according to at least one illustrated embodiment.

FIG. 6 shows a machine-readable symbol reader 600, according to at least one illustrated embodiment. A shield 606 is carried by or mounted to the reader 600.

The machine-readable symbol reader 600 can be any device capable of reading (e.g., detecting and/or decoding) machine-readable symbols. For example, machine-readable symbol reader 600 can be the same as or similar to the machine-readable symbol reader 110 of FIG. 1.

Machine-readable symbol reader 600 has a housing 602 that encloses one or more components of the reader 600. A window 604 in the housing 602 is transmissive to at least some wavelengths of light.

A shield 606 is physically coupled to the machine-readable symbol reader 600. In particular, as shown in FIG. 6, the shield 606 is mounted to the housing 602 in front of the window 604. One or more fasteners (e.g., screws as shown in FIG. 6), welding, adhesive, or other coupling means mount the shield 606 to the reader 600. Thus, in some implementations, the housing 602 has one or more recesses for respectively receiving the one or more fasteners.

As shown in FIG. 6, the shield 606 includes a first side support 608 and a second side support 610. The first and second side supports 608 and 610 are positioned at opposite sides of the window 604 and are respectively physically coupled to the housing 602 using one or more fasteners.

The shield 606 further includes a plurality of bars, including, for example, bars 612 and 614. The bars can be metal bars or can be formed of other materials. The bars of shield 606 can be the same as or similar to the bars of shield 200 of FIG. 2. In some implementations, shield 606 includes a plurality of wires in addition to or alternatively to the plurality of bars. For example, the wires can be the same as or similar to the wires of shield 300 of FIG. 3.

The shield 606 includes a plurality of apertures that are transmissive to light. For example, bars 612 and 614 form an aperture 616 therebetween.

Figure 7:
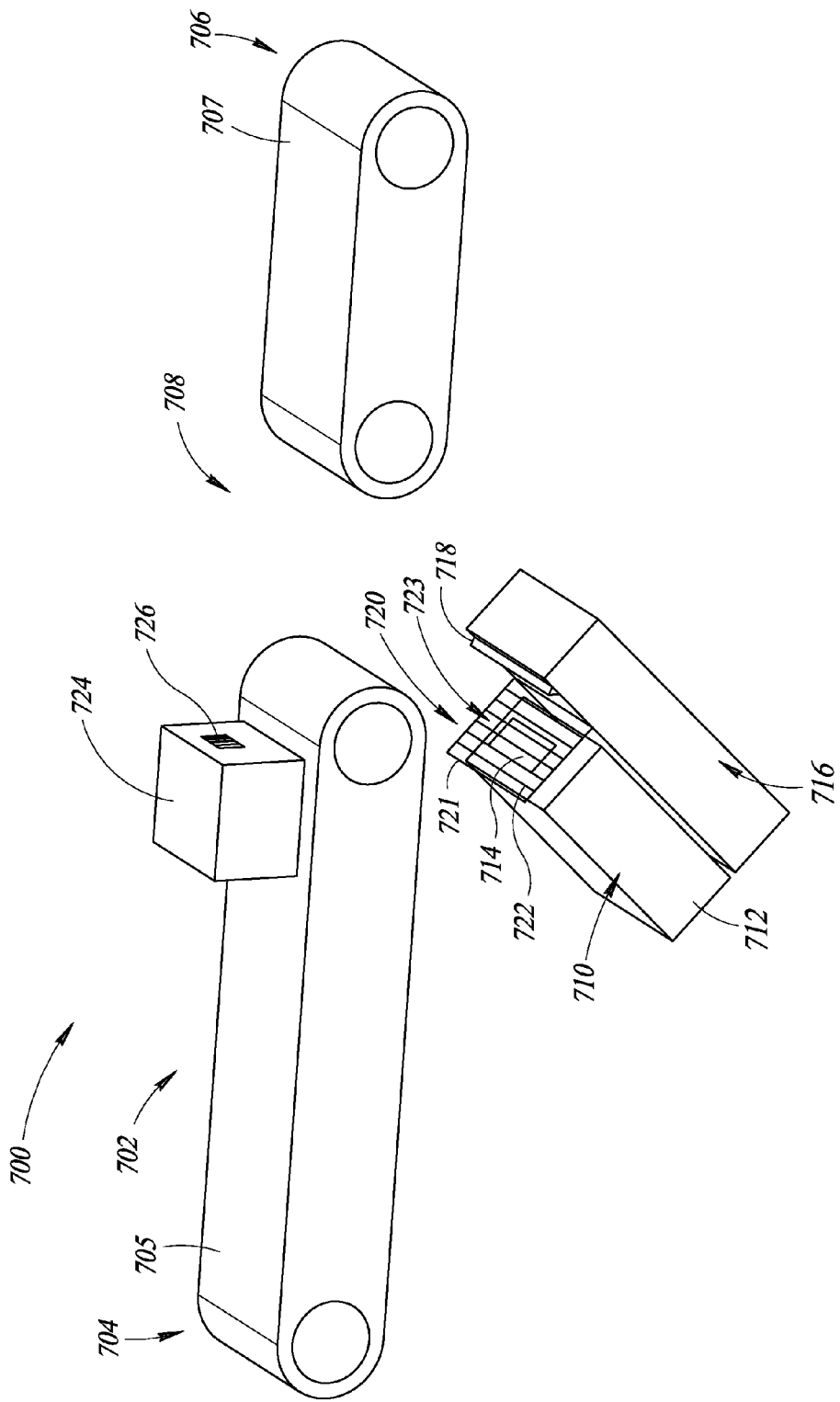
FIG. 7 is an isometric view of a machine-readable symbol reader system including a blower positioned to circulate a fluid (e.g., air) across a window of the machine-readable symbol reader, according to at least one illustrated embodiment.

FIG. 7 shows a machine-readable symbol reader system 700, according to at least one illustrated embodiment. The system 700 includes a conveyor system 702, a machine-readable symbol reader 710, and a blower 716. A shield 720 is physically coupled to the blower 716.

The conveyor system 702 conveys objects (e.g., object 724) bearing one or more machine-readable symbols (e.g., machine-readable symbol 726) between a first location 705 and a second location 707. The conveyor system 702 conveys objects past a first region 708 that is transmissive to light. The conveyor system 702 can be the same as or similar to the conveyor system 102 of FIG. 1.

As shown in FIG. 7, the conveyor system 702 includes a first conveyor assembly 704 and a second conveyor assembly 706. The first region 708 that is transmissive to light can, for example, take the form of a discontinuity between the first conveyor assembly 704 and the second conveyor assembly 706. Thus, for example, object 724 bearing a machine-readable symbol 726 passes across the first region 708 as the object 724 transits from the first location 705 to the second location 707 via the first conveyor assembly 704 and the second conveyor assembly 706.

The machine-readable symbol reader 710 can be any device capable of reading (e.g., detecting and/or decoding) machine-readable symbols (e.g., PDF717, Code 128, etc.). For example, the machine-readable symbol reader 710 can be an imaging-based symbol reader, a laser-based symbol reader, or other types of machine-readable symbol readers. The machine-readable symbol reader 710 can be the same as or similar to the machine-readable symbol reader 110 of FIG. 1.

The machine-readable symbol reader 710 has a housing 712. The housing 712 encloses one or more components of the machine-readable symbol reader 710. A window 714 in the housing 712 is transmissive to at least some wavelengths of light. Generally, the window 714 is designed and/or positioned relative to the housing 712 to enable various components received within the housing 712 to transmit or receive light. For example, light reflected or fluoresced from a machine-readable symbol enters the reader housing 712 via the window 714. The machine-readable symbol reader 710 may actively illuminate the machine-readable symbol, or may rely on illumination in the ambient environment to illuminate the machine-readable symbol.

An optical sensor received within the housing 712 detects the light and produces a representative signal. Circuitry, for instance a processor, processes the representative signal to read the symbol. Components enclosed within the housing 712 can illuminate the machine-readable symbol (e.g., through flood illumination or laser scanning) via the window 714, as well.

In some implementations, the window 714 includes a glass pane or other light transmissive barrier placed across the window opening. The glass pane or other light transmissive barrier can prevent the entry of objects or contaminants into the reader housing 712.

The system 700 further includes a blower 716. The blower 716 causes circulation of a fluid (e.g., air) across the window 714. Thus, the blower 716 can include a fan or other components for causing the movement of at least one fluid. In some implementations, the blower 716 blows the fluid out of a vent 718. The vent 718 directs the circulation of fluid across the window 714.

The blower 716 can be stationary or can have components that periodically rotate. In some implementations, the blower 716 is physically coupled to the machine-readable symbol reader 710. For example, the reader 710 rests upon the blower 716. In other implementations, brackets respectively hold the reader 710 and the blower 716 adjacent to each other. The blower 716 can have many shapes or designs different than the example shape shown in FIG. 7.

The machine-readable symbol reader system 700 further includes a shield 720 physically coupled to blower 716. The shield 720 prevents items larger than a defined size (e.g., objects falling from the conveyor system 702) from passing through the shield 720.

The shield 720 has a frame 721 with a plurality of elements 722 (only one called out) which form a plurality of apertures 723 (only one called out) that are transmissive to light. The shield 720 prevents items (e.g., objects falling from the conveyor system 702) larger than a defined size (i.e., dimensions of the apertures 723) from passing through the shield 720.

In some implementations, the shield 720 includes a grate (e.g., a metal grate). The grate can be shaped as a grill or a grid. In some implementations, the shield 720 includes a plurality of bars 210. For example, the shield 720 can be the same as or similar to shield 200 of FIG. 2. In some implementations, the shield 720 includes a plurality of wires 310. For example, the shield 720 can be the same as or similar to shield 300 of FIG. 3. The spacing between the elements 722 of the frame 721 of the shield 720 is set to assure that items likely to damage the machine-readable symbol reader will not pass through the shield 720. For example, an item's likelihood of causing damage may be related to density and size or volume and/or type of material (e.g., metal, cardboard, plastic), and the presence or absence of sharp edges or points. The spacing of the elements 722 may be set to form apertures 723 with dimensions sufficiently small to prevent the passage of items likely to cause damage, while not overly obscuring a field of view of the machine-readable symbol reader 710.

As shown in FIG. 7, the machine-readable symbol reader is positioned relatively below the conveyor system 702. The optical sensor received within the housing 712 captures an image of a field of view that extends outward of the window 714. In particular, as shown in FIG. 7, the field of view is aligned with the first region 708 of the conveyor system 702.

The shield 720 is physically coupled to the blower 716. The blower 716 is positioned so that the shield 720 is placed in front of the window 714. In some implementations, the shield 720 is integral to the blower 716. In other implementations, one or more of welding, fasteners (e.g., screws, bolts, pins, etc.), adhesive, or other coupling means mount the shield 720 to the blower 716. For example, the shield 720 can be an after-market addition to the blower 716. The shield 720 can be positioned at various distances from the window 714.

The machine-readable symbol reader 710 reads one or more machine-readable symbols present on an object as the object passes over the first region 708. In particular, light reflected or fluoresced from a machine-readable symbol passes through the first region 708, the apertures 723 of the shield 720, and the window 714 to reach the optical sensor of the machine-readable symbol reader 710. Thus, the shield 720 protects the window 714 from environmental hazards (e.g., falling objects) without interfering with the reading or illumination of symbols by the reader 710. In particular, in some implementations, the shield 720 is positioned so that an illumination (e.g., laser beam, flood light) can pass through at least one aperture of the shield 720 and reach the first region 708.

In some implementations, conveyor assemblies 704 and 706 are conveyor belt assemblies, as shown in FIG. 7. In other implementations, the conveyor system 702 includes different conveyor types in addition or alternatively to belt-based assemblies 704 and 706. For example, conveyor system 702 can include roller conveyor assemblies, slat conveyor assemblies, wire mesh conveyor assemblies, chutes, and/or other machines or structures for moving objects. In some implementations, the conveyor system 702 includes only a single conveyor assembly.

Furthermore, although FIG. 7 shows conveyor assemblies 704 and 706 at a same relative height, in some implementations, the assemblies 704 and 706 are at different heights, orientations, angles, or directions relative to each other. For example, in some implementations, conveyor assembly 706 is at a lower relative height than conveyor assembly 704, so that the objects more easily transition over the discontinuity between assemblies.

In addition, although FIG. 7 shows the first region 708 as a discontinuity between assemblies 704 and 706, such discontinuity is provided as an example only. The conveyor system 702 can include a first region 708 that is transmissive to light that has other, different structures. For example, the first region 708 that is transmissive to light can take the form of an aperture formed within a single conveyor assembly (e.g., an aperture formed between spaced rollers of a roller conveyor assembly), a portion of a conveyor assembly that is transmissive to light (e.g., a clear plastic or glass window embedded within a conveyor assembly), or many other structures. Furthermore, in some implementations, a guide that is transmissive to light is placed in the discontinuity between assemblies 704 and 706.

The housing 712 of the machine-readable symbol reader 710 can be formed from various materials or combinations of materials including metals, plastics, rubbers, or other materials. The housing 712 can be continuous or formed from multiple components that are physically coupled. In some implementations, a user interface (not shown) or other interactive features or components is located on the exterior of the housing 712 to allow convenient operation. In some implementations, various ports or interfaces for permitting electrical or communicative coupling of the machine-readable symbol reader 710 to other machines or power sources are formed within the housing 712.

The window 714 has a first set of dimensions including at least a first length and a first width. The shield 720 has a second set of dimensions including at least a second length and a second width. In some implementations of the present disclosure, the second length is at least equal or greater than the first length and the second width is at least equal or greater than the first width. For example, as shown in FIG. 7, the shield 720 has a width that is greater than the width of the window 714 and a length that is greater than the length of the window 714. Therefore, the shield 720 encompasses the entire width and length of the window 714.

In some implementations, each of the plurality of apertures 723 within the shield 720 extends across an entirety of the window 714 in at least one direction to form a plurality of unobstructed optical planes between the first region 708 of the conveyor system 702 and the window 714. As an example, as shown in FIG. 7, each aperture of the shield 720 extends across an entire width of the window 714 to form a plurality of unobstructed optical planes in the horizontal direction relative to the reader 712. Thus, for example, the apertures 723 have a width that is greater than or equal to the width of the window 714. However, in other implementations, the unobstructed optical planes are formed in directions other than horizontal relative to the reader 712 (e.g., vertical or diagonal relative to the reader).

The shield 720 has an upper face that intercepts objects falling from the conveyor system 702. In some implementations, the shield 720 is positioned with the upper face at an angle with respect to the direction of gravity. Therefore, the upper face of the shield 720 redirects objects that fall from the conveyor system 702 away from the shield 720 and machine-readable symbol reader 710, rather than allowing the objects to come to rest upon the upper face.

Figure 8:
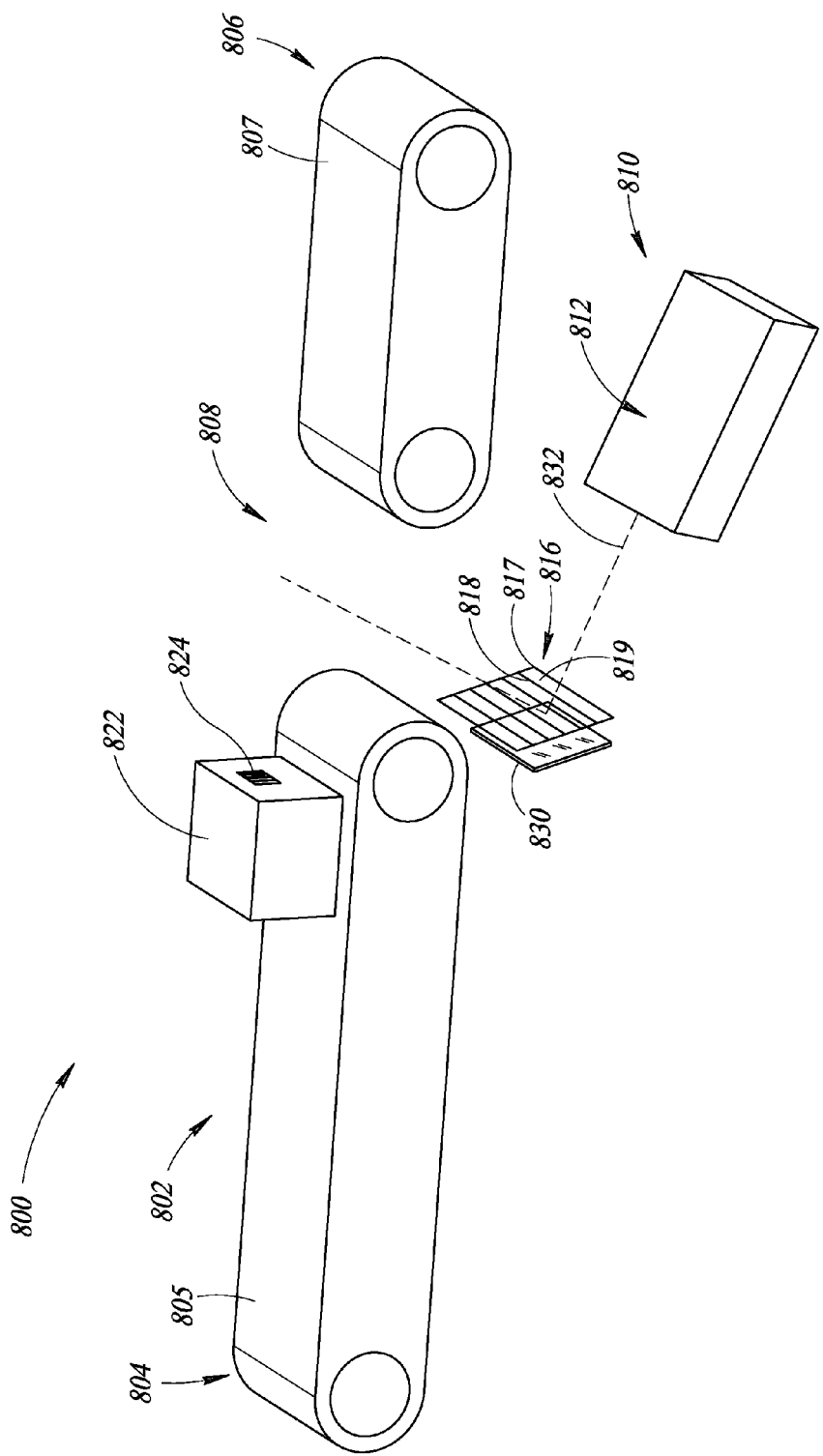
FIG. 8 is an isometric view of a machine-readable symbol reader system including a shield positioned to protect a mirror, according to at least one illustrated embodiment.

FIG. 8 shows a machine-readable symbol reader system 800, according to at least one illustrated embodiment. The system 800 includes a conveyor system 802 and a machine-readable symbol reader 810. A shield 816 is positioned to protect a mirror 830.

The conveyor system 802 conveys objects (e.g. object 822) bearing one or more machine-readable symbols (e.g., machine-readable symbol 824) between a first location 805 and a second location 807. The conveyor system 802 conveys objects past a first region 808 that is transmissive to light. The conveyor system 802 can be the same as or similar to the conveyor system 102 of FIG. 1.

As shown in FIG. 8, the conveyor system 802 includes a first conveyor assembly 804 and a second conveyor assembly 806. The first region 808 that is transmissive to light can, for example, take the form of a discontinuity between the first conveyor assembly 804 and the second conveyor assembly 806. Thus, for example, object 822 bearing a machine-readable symbol 824 passes across the first region 808 as the object 822 transits from the first location 805 to the second location 807 via the first conveyor assembly 804 and the second conveyor assembly 806.

The machine-readable symbol reader 810 can be any device capable of reading (e.g., detecting and/or decoding) machine-readable symbols (e.g., PDF817, Code 128, etc.). For example, the machine-readable symbol reader 810 can be an imaging-based symbol reader, a laser-based symbol reader, or other types of machine-readable symbol readers. The machine-readable symbol reader 810 can be the same as or similar to the machine-readable symbol reader 110 of FIG. 1.

The machine-readable symbol reader 810 has a housing 812. The housing 812 encloses one or more components of the machine-readable symbol reader 810. A window in the housing 812 is transmissive to at least some wavelengths of light. Generally, the window is designed and/or positioned relative to the housing 812 to enable various components received within the housing 812 to transmit or receive light. For example, light reflected or fluoresced from a machine-readable symbol enters the reader housing 812 via the window. The machine-readable symbol reader 810 may actively illuminate the machine-readable symbol, or may rely on illumination in the ambient environment to illuminate the machine-readable symbol.

An optical sensor received within the housing 812 detects the light and produces a representative signal. Circuitry, for instance a processor processes the representative signal to read the symbol. Components enclosed within the housing 812 can illuminate the machine-readable symbol (e.g., through flood illumination or laser scanning) via the window, as well.

In some implementations, the window includes a glass pane or other light transmissive barrier placed across the window opening. The glass pane or other barrier can prevent the entry of objects or contaminants (e.g., dust, moisture) into the reader housing 812.

The machine-readable symbol reader system 800 further includes a shield 816 that is positioned to protect a mirror 830 of the system 300. The shield 816 prevents items larger than a defined size (e.g., objects falling from the conveyor system 802) from passing through the shield 816. The shield 816 can be positioned at various distances from the mirror 830.

The shield 816 has a frame 817 with a plurality of elements 818 (only one called out) which form a plurality of apertures 819 (only one called out) that are transmissive to light. For example, as shown in FIG. 8, the shield 816 has an aperture 819.

In some implementations, the shield 816 includes a grate (e.g., a metal grate). The grate can be shaped as a grill or a grid. In some implementations, the shield 816 includes a plurality of bars 210. For example, the shield 816 can be the same as or similar to shield 200 of FIG. 2. In some implementations, the shield 816 includes a plurality of wires 310. For example, the shield 816 can be the same as or similar to shield 300 of FIG. 3. The spacing between the elements 818 of the frame 817 of the shield 816 is set to assure that items likely to damage the machine-readable symbol reader will not pass through the shield 816. For example, an item's likelihood of causing damage may be related to density and size or volume and/or type of material (e.g., metal, cardboard, plastic), and the presence or absence of sharp edges or points. The spacing of the elements 818 may be set to form apertures 819 with dimensions sufficiently small to prevent the passage of items likely to cause damage, while not overly obscuring a field of view of the machine-readable symbol reader 810.

As shown in FIG. 8, the machine-readable symbol reader 810 is positioned relatively below the conveyor system 802. The optical sensor received within the housing 812 captures an image of a field of view that extends outward of the window. In particular, as shown in FIG. 8, the field of view is aligned with the first region 808 of the conveyor system 802 via reflection by the mirror 830 according to an optical path 832.

More particularly, the mirror 830 reflects light to redirect the optical path 832 associated with the field of view of the machine-readable symbol reader 810. In particular, the mirror 830 can redirect light reflected or fluoresced from a machine-readable symbol (e.g., symbol 824) towards the window of the machine-readable symbol reader 810. Likewise, the mirror 830 can redirect illumination light emitted by the machine-readable symbol reader 810 (e.g., laser beam or flood light) towards the first region 808, as illustrated by the optical path 832. The mirror 830 can be any type of mirror or other optically reflective device including, for example, a metal-coated mirror, a dielectric mirror, or other such devices.

Thus, the machine-readable symbol reader 810 reads one or more machine-readable symbols present on an object as the object passes over the first region 808. In particular, light reflected or fluoresced from a machine-readable symbol passes through the first region 808 and the apertures of the shield 816, is reflected by the mirror 830, and passes through the window to reach the optical sensor of the machine-readable symbol reader 810. The light reflected or fluoresced from a machine-readable symbol may or may not pass through the apertures of the shield 816 after reflection by the mirror, depending on the location of such components.

Thus, the shield 816 protects the mirror 830 from environmental hazards (e.g., falling objects) without interfering with the reading or illumination of symbols by the reader 810 via the optical path 832. In particular, in some implementations, the shield 816 is positioned so that illumination (e.g., laser beam, flood light) can pass through at least one aperture of the shield 816 and reach the first region 808.

In some implementations, conveyor assemblies 804 and 806 are conveyor belt assemblies, as shown in FIG. 8. In other implementations, the conveyor system 802 includes different conveyor types in addition or alternatively to belt-based assemblies 804 and 806. For example, conveyor system 802 can include roller conveyor assemblies, slat conveyor assemblies, wire mesh conveyor assemblies, chutes, and/or other machines or structures for moving objects. In some implementations, the conveyor system 802 includes only a single conveyor assembly.

Furthermore, although FIG. 8 shows conveyor assemblies 804 and 806 at a same relative height, in some implementations, the assemblies 804 and 806 are at different heights, orientations, angles, or directions relative to each other. For example, in some implementations, conveyor assembly 806 is at a lower relative height than conveyor assembly 804, so that the objects more easily transition over the discontinuity between assemblies.

In addition, although FIG. 8 shows the first region 808 as a discontinuity between assemblies 804 and 806, such discontinuity is provided as an example only. The conveyor system 802 can include a first region 808 that is transmissive to light that has other, different structures. For example, the first region 808 that is transmissive to light can take the form of an aperture formed within a single conveyor assembly (e.g., an aperture formed between spaced rollers of a roller conveyor assembly), a portion of a conveyor assembly that is transmissive to light (e.g., a clear plastic or glass window embedded within a conveyor assembly), or many other structures. Furthermore, in some implementations, a guide that is transmissive to light is placed in the discontinuity between assemblies 804 and 806.

The housing 812 of the machine-readable symbol reader 810 can be formed from various materials or combinations of materials including metals, plastics, rubbers, or other materials. The housing 812 can be continuous or formed from multiple components that are physically coupled. In some implementations, a user interface (not shown) or other interactive features or components is located on the exterior of the housing 812 to allow convenient operation. In some implementations, various ports or interfaces for permitting electrical or communicative coupling of the machine-readable symbol reader 810 to other machines or power sources are formed within the housing 812.

The mirror 830 has a first set of dimensions including at least a first length and a first width. The shield 816 has a second set of dimensions including at least a second length and a second width. In some implementations of the present disclosure, the second length is at least equal or greater than the first length and the second width is at least equal or greater than the first width. For example, as shown in FIG. 8, the shield 816 has a width and a length that is greater than the width and the length of the mirror 830. Therefore, the shield 816 encompasses the entire area of the mirror 830.

In some implementations, each of the plurality of apertures 819 within the shield 816 extends across an entirety of the mirror 830 in at least one direction to form a plurality of unobstructed optical planes between the first region 808 of the conveyor system 802 and the mirror 830. As an example, as shown in FIG. 8, each aperture 819 of the shield 816 extends across an entire width of the mirror 830 to form a plurality of unobstructed optical planes in the horizontal direction relative to the mirror 830. However, in other implementations, the unobstructed optical planes are formed in directions other than horizontal relative to the mirror 830 (e.g., vertical or diagonal relative to the mirror).

The shield 816 has an upper face that intercepts objects falling from the conveyor system 802. In some implementations, the shield 816 is positioned with the upper face at an angle with respect to the direction of gravity. Therefore, the upper face of the shield 816 redirects objects that fall from the conveyor system 802 away from the shield 816 and mirror 830, rather than allowing the objects to come to rest upon the upper face.

In addition, although FIG. 8 depicts shield 816 positioned to protect mirror 830, in some implementations, the shield 816 can be positioned to protect both the mirror 830 and the machine-readable symbol reader 810 simultaneously. In other implementations, an additional shield (e.g., similar to shield 816) can be positioned to protect the machine-readable symbol reader 810 while shield 816 protects mirror 830.

Figure 9:
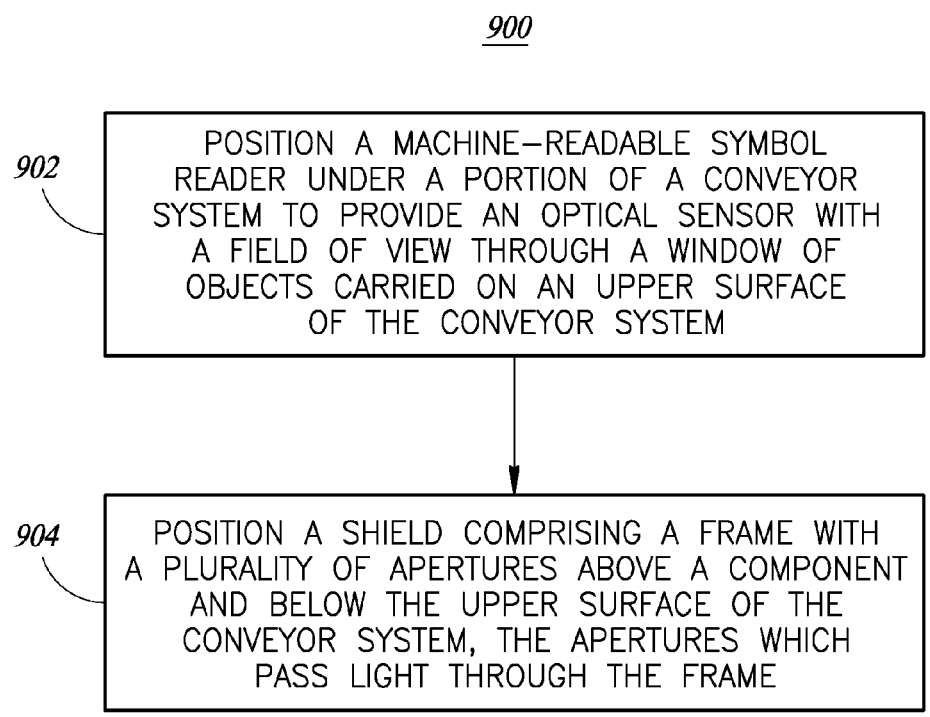
FIG. 9 is a flow chart diagram showing a method of protecting a machine-readable symbol reader, according to at least one illustrated embodiment.

FIG. 9 is a flow chart diagram showing a method 900 of protecting a machine-readable symbol reader, according to at least one illustrated embodiment. The method begins at 902.

At 902, a machine-readable symbol reader is positioned under a portion of a conveyor system to provide an optical sensor with a field of view through a window of objects carried on an upper surface of the conveyor system. As an example, as shown in FIG. 1, the machine-readable symbol reader 110 is positioned under a portion of the conveyor system 102 to provide the optical sensor of the reader 110 with a field of view through window 114 of objects carried on the upper surface of the conveyor system 102. As another example, as shown in FIG. 8, the machine-readable symbol reader 810 is positioned under a portion of the conveyor system 802 to provide the optical sensor of the reader 810 with a field of view via optical path 832 of objects carried on the upper surface of the conveyor system 802.

Referring again to FIG. 9, at 904 a shield comprising a frame with a plurality of apertures is positioned above a component of the machine-readable symbol reader system and below the upper surface of the conveyor system, the apertures which pass light through the frame. The component can be a mirror. As an example, as shown in FIG. 8, the shield 816 is positioned above the mirror 830 and below the upper surface of the conveyor system 802. The apertures 819 of the shield 816 pass light through the shield 816.

Referring again to FIG. 9, in other implementations, the component above which the shield is positioned can be a window of a machine-readable symbol reader. As an example, as shown in FIG. 1, the shield 116 is positioned above the window 114 and below the upper surface of the conveyor system 102. The apertures 119 of shield 116 pass light through the shield 116.

Referring again to FIG. 9, in some implementations, positioning the shield at 904 includes positioning a shield having a plurality of bars or a plurality of wires to encompass the window. As another example, in some implementations, positioning the shield at 904 includes positioning a shield having a plurality of parallel bars or a plurality of parallel wires to encompass the window.

In further implementations, the shield is integral to a blower and positioning the shield at 904 includes positioning the blower such that the shield is above the window and below the upper surface of the conveyor system. As an example, as shown in FIG. 7, the shield 720 is physically coupled to the blower 716 and the blower 716 is positioned such that the shield 720 is above the window 714 and below the upper surface of the conveyor system 702.

Referring again to FIG. 9, in some implementations, positioning the shield at 904 includes one or more of physically coupling the shield to the conveyor system or physically coupling the shield to the machine-readable symbol reader. For example, one or more of welding, fasteners (e.g., screws, bolts, pins, etc.), adhesive, or other coupling means can physically couple the shield to the conveyor system and/or the machine-readable symbol reader.

Method 900 can end after 904.

Those of skill in the art will recognize that many of the methods or algorithms set out herein may employ additional acts, may omit some acts, and/or may execute acts in a different order than specified.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A shield to protect a component of a machine-readable symbol reader system, the component having an area and a first set of dimensions including at least a first length and a first width, the shield comprising:
a frame having a plurality of apertures through which light passes, the frame having a second set of dimensions, the second set of dimensions including at least a second length and a second width, the second length at least equal or greater than the first length and the second width at least equal or greater than the first width, the shield positionable relatively above the component to provide a plurality of unobstructed optical planes through the shield to the component while encompassing the area of the component.

2. The shield of claim 1 wherein the component comprises a window of a machine-readable symbol reader.

3. The shield of claim 1 wherein the component comprises a mirror.

4. The shield of claim 1 wherein the component comprises a housing of a machine-readable symbol reader.

5. The shield of claim 1 wherein the shield includes at least one of a plurality of bars or a plurality of wires.

6. The shield of claim 1 wherein the frame of the shield includes at least one of a plurality of metal bars or a plurality of metal wires.

7. The shield of claim 1 wherein the shield includes at least a plurality of bars, each of the plurality of bars having a longitudinal axis that is perpendicular to a direction of conveyance in which a conveyor conveys objects relatively above the shield.

8. The shield of claim 1 wherein each of the plurality of apertures extends across an entirety of the component in at least one direction such that the plurality of unobstructed optical planes extends between the component and a conveyor.

9. The shield of claim 1 wherein the shield is physically coupled to a conveyor which conveys objects.

10. The shield of claim 1 wherein the shield is physically coupled to the machine-readable symbol reader system.

11. The shield of claim 1 wherein the shield is integral to a housing of the machine-readable symbol reader.

12. The shield of claim 1 wherein the shield has an upper face positioned at an angle with respect to a direction of gravity.

13. The shield of claim 1 wherein each of the plurality of apertures are sized to prevent passage of items likely to damage the component.

14. The shield of claim 1, further comprising:
one or more components that are selectively electrically energizable to generate heat.

15. The shield of claim 1 wherein the shield is physically coupled to a blower positioned to cause a circulation of fluid across the component.

16. The shield of claim 1 wherein the shield is integral to a blower positioned to cause a circulation of fluid across the component.

17. A shield to protect a component of a machine-readable symbol reader system, the component having an area and a first set of dimensions including at least a first length and a first width, the shield comprising:
a frame having a plurality of apertures through which light passes, the frame having a second set of dimensions, the second set of dimensions including at least a second length and a second width, the second length at least equal or greater than the first length and the second width at least equal or greater than the first width, the shield positionable relatively above the component to provide a plurality of unobstructed optical planes through the shield to the component while encompassing the area of the component,
wherein the shield includes a grate.

18. The shield of claim 17 wherein the grate is metal.

19. The shield of claim 17 wherein the grate is shaped as a grill or grid.

20. A shield to protect a component of a machine-readable symbol reader system, the component having an area and a first set of dimensions including at least a first length and a first width, the shield comprising:
a frame having a plurality of apertures through which light passes, the frame having a second set of dimensions, the second set of dimensions including at least a second length and a second width, the second length at least equal or greater than the first length and the second width at least equal or greater than the first width, the shield positionable relatively above the component to provide a plurality of unobstructed optical planes through the shield to the component while encompassing the area of the component
wherein the plurality of apertures collectively have a first surface area, any portions of the frame that obstruct light collectively have a second surface area, and the first surface area is greater than or equal to the second surface area.

* * * * *